(12) United States Patent
McCorkle

(10) Patent No.: US 7,400,669 B2
(45) Date of Patent: *Jul. 15, 2008

(54) LEAKAGE NULLING RECEIVER CORRELATOR STRUCTURE AND METHOD FOR ULTRA WIDE BANDWIDTH COMMUNICATION SYSTEM

(75) Inventor: John W. McCorkle, Vienna, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 402 days.

This patent is subject to a terminal disclaimer.

(21) Appl. No.: 11/165,541

(22) Filed: Jun. 24, 2005

(65) Prior Publication Data

US 2006/0029138 A1    Feb. 9, 2006

Related U.S. Application Data

(63) Continuation of application No. 09/685,200, filed on Oct. 10, 2000, now Pat. No. 6,937,646.

(51) Int. Cl.
*H04B 1/00* (2006.01)
(52) U.S. Cl. ........................ 375/150; 375/147
(58) Field of Classification Search ............... 375/150, 375/130, 147
See application file for complete search history.

(56) References Cited

U.S. PATENT DOCUMENTS

| | | | | | |
|---|---|---|---|---|---|
| 4,007,630 | A | * | 2/1977 | Noda | 73/593 |
| 5,442,593 | A | * | 8/1995 | Woodbury et al. | 367/135 |
| 5,912,639 | A | * | 6/1999 | Beckner | 342/22 |
| 5,966,090 | A | * | 10/1999 | McEwan | 342/27 |
| 6,262,634 | B1 | * | 7/2001 | Flanagan et al. | 331/25 |

* cited by examiner

*Primary Examiner*—Mohammad H. Ghayour
*Assistant Examiner*—Juan A. Torres

(57) ABSTRACT

A receiver correlator structure for an ultra wide bandwidth communication system includes an antenna, a mixer, a bandpass filter, and a convertor. The receiver receives, via the antenna, an ultra wide bandwidth signal comprising a sequence of wavelets of particular shapes and positions, and transmits the received ultra wide bandwidth signal to the mixer. The mixer also receives and mixes with the received ultra wide bandwidth signal a local ultra wide bandwidth signal comprising a sequence of wavelets of particular shapes and positions correlated to the received ultra wide bandwidth signal. The bandpass filter removes the DC components from the mixed signal, and provides the resultant signal to the convertor. The receiver structure eliminates the local ultra wide bandwidth signal AC bias and DC bias terms and 1/f noise, yet detects long sequences of logical 1's and 0's, and allows operation with reduced bandwidth convertors.

22 Claims, 7 Drawing Sheets

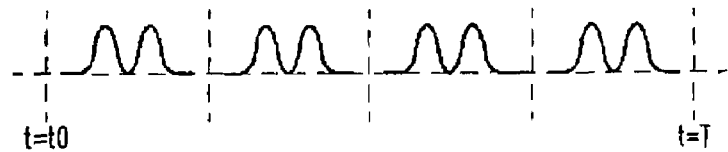
*FIG. 4A*  —RELATED ART—
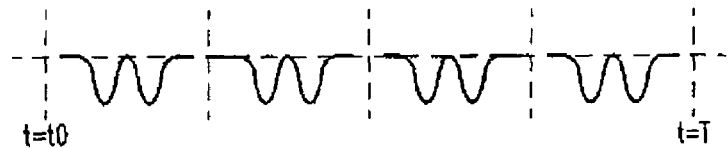
*FIG. 4B*  —RELATED ART—
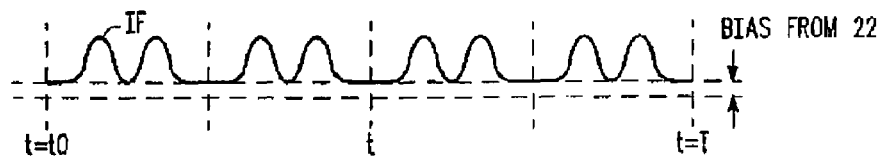
*FIG. 5A*  —RELATED ART—
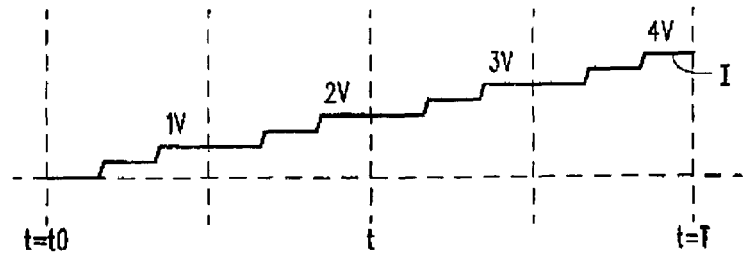
*FIG. 5B*  —RELATED ART—
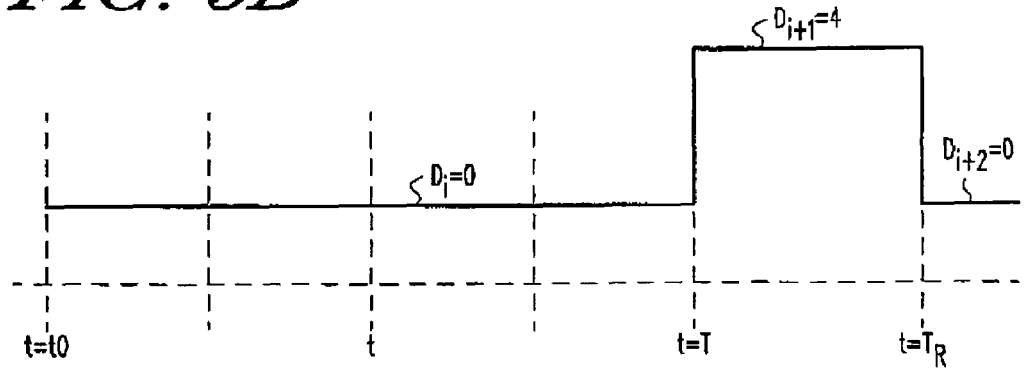
*FIG. 5C*
—RELATED ART—

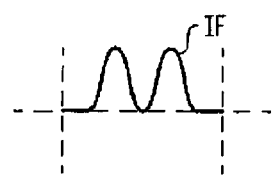
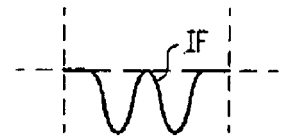
*FIG. 10A*  *FIG. 10B*
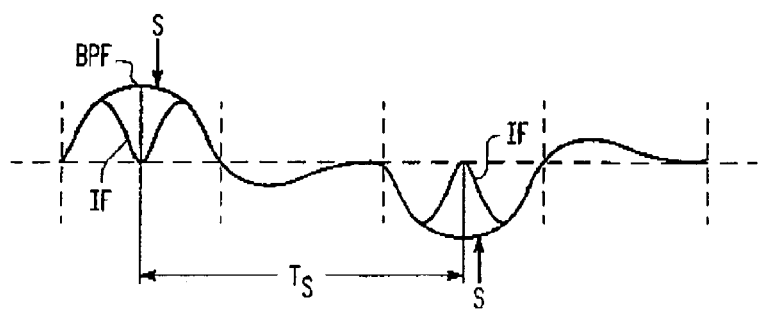
*FIG. 11A*
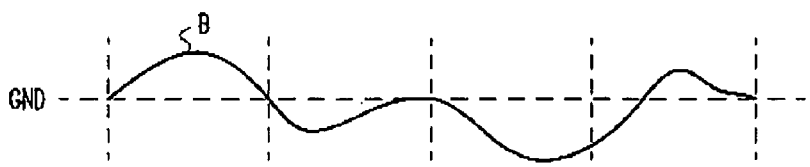
*FIG. 11B*
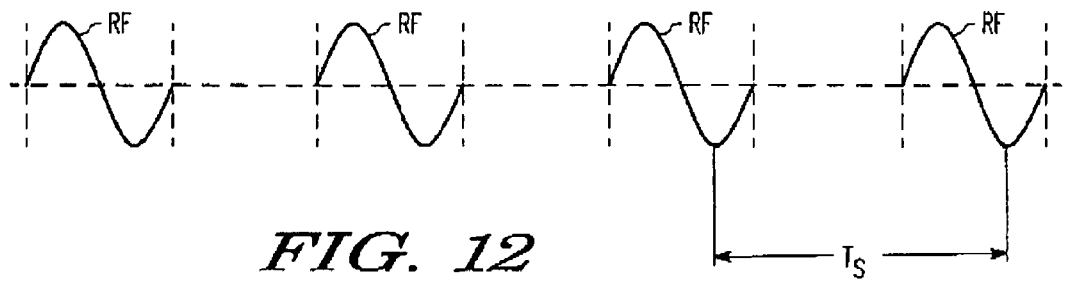
*FIG. 12*

| RF | LO | RECEIVER CORRELATOR 30 | RECEIVER CORRELATOR 10 |
|---|---|---|---|
| 1 | 1 | +1V | 1+a |
| 0 | 0 | +1V | 1−b |
| 1 | 0 | −1V | −1−b |
| 0 | 1 | −1V | −1−a |

*FIG. 14*   $\underline{90}$

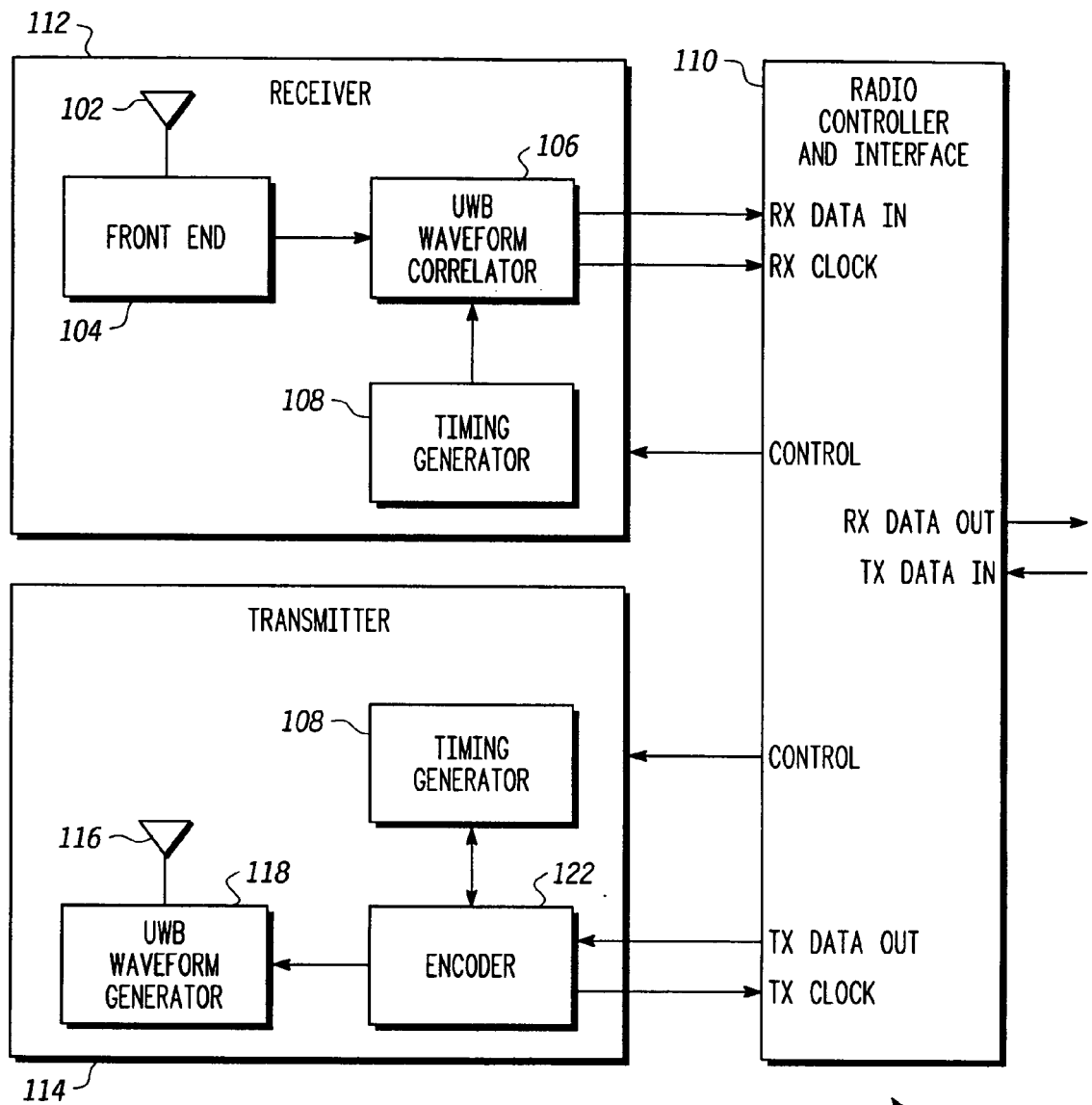
FIG. 15
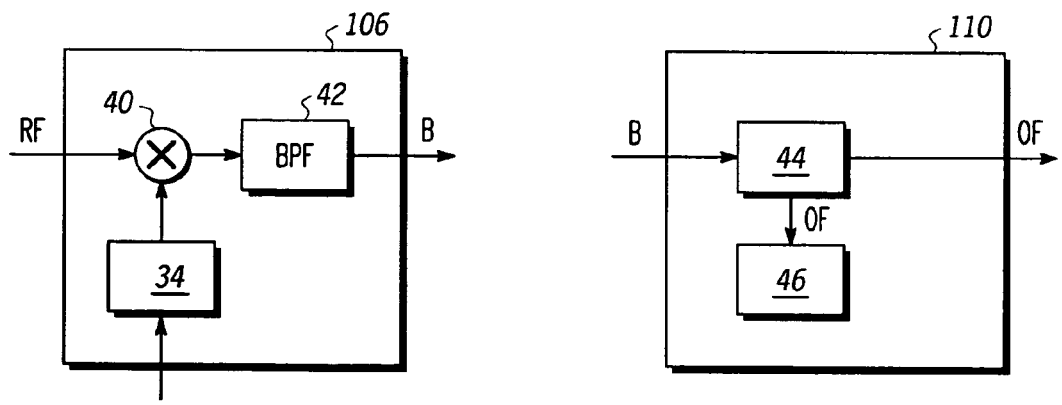
FIG. 16
FIG. 17

LEAKAGE NULLING RECEIVER CORRELATOR STRUCTURE AND METHOD FOR ULTRA WIDE BANDWIDTH COMMUNICATION SYSTEM

CROSS REFERENCE TO RELATED APPLICATION

The present application is a continuation application of U.S. patent application Ser. No. 09/685,200, filed Oct. 10, 2000, entitled LEAKAGE NULLING RECEIVER CORRELATOR STRUCTURE AND METHOD FOR ULTRA WIDE BANDWIDTH COMMUNICATION SYSTEM, now issued as U.S. Pat. No. 6,937,646.

The present document contains subject matter related to that disclosed in the following commonly owned, and co-pending U.S. patent application Ser. No. 09/209,460 filed Dec. 11, 1998, entitled ULTRA WIDE BANDWIDTH SPREAD-SPECTRUM COMMUNICATIONS SYSTEM, now issued as U.S. Pat. No. 6,700,939; Ser. No. 09/633,815 filed Aug. 7, 2000, entitled ELECTRICALLY SMALL PLANAR UWB ANTENNA; Ser. No. 09/563,292 filed May 3, 2000, entitled PLANAR ULTRA WIDE BAND ANTENNA WITH INTEGRATED ELECTRONICS, now issued as U.S. Pat. No. 6,351,246; Ser. No. 60/207,225 filed May 26, 2000, entitled ULTRA WIDEBAND COMMUNICATION SYSTEM AND METHOD; Ser. No. 09/685,198 filed Oct. 10, 2000, entitled ANALOG SIGNAL SEPARATOR FOR UWB VERSUS NARROWBAND SIGNALS, now issued as U.S. Pat. No. 7,006,553; Ser. No. 60/238,466 filed Oct. 10, 2000, entitled ULTRA WIDE BANDWIDTH NOISE CANCELLATION MECHANISM AND METHOD; Ser. No. 60/217,099 filed Jul. 10, 2000, entitled MULTIMEDIA WIRELESS PERSONAL AREA NETWORK (WPAN) PHYSICAL LAYER SYSTEM AND METHOD; Ser. No. 09/685,203 filed Oct. 10, 2000, entitled SYSTEM AND METHOD FOR BASEBAND REMOVAL OF NARROWBAND INTERFERENCE IN ULTRA WIDEBAND SIGNALS, now issued as U.S. Pat. No. 6,834,073; Ser. No. 09/685,197 filed Oct. 10, 2000, entitled MODE CONTROLLER FOR SIGNAL ACQUISITION AND TRACKING IN AN ULTRA WIDEBAND COMMUNICATION SYSTEM, now issued as U.S. Pat. No. 6,965,630; Ser. No. 09/684,400 filed Oct. 10, 2000, entitled ULTRA WIDEBAND COMMUNICATION SYSTEM, METHOD, AND DEVICE WITH LOW NOISE PULSE FORMATION, now issued as U.S. Pat. No. 6,735,238; Ser. No. 09/685,195 filed Oct. 10, 2000, entitled ULTRA WIDE BANDWIDTH SYSTEM AND METHOD FOR FAST SYNCHRONIZATION, now issued as U.S. Pat. No. 6,925,108; Ser. No. 09/684,401 filed Oct. 10, 2000, entitled ULTRA WIDE BANDWIDTH SYSTEM AND METHOD FOR FAST SYNCHRONIZATION USING SUB CODE SPINS, now issued as U.S. Pat. No. 6,967,993; Ser. No. 09/685,196 filed Oct. 10, 2000, entitled ULTRA WIDE BANDWIDTH SYSTEM AND METHOD FOR FAST SYNCHRONIZATION USING MULTIPLE DETECTION ARMS, now issued as U.S. Pat. No. 7,079,604; Ser. No. 09/685,202 filed Oct. 10, 2000, entitled METHOD AND SYSTEM FOR ENABLING DEVICE FUNCTIONS BASED ON DISTANCE INFORMATION, now issued as U.S. Pat. No. 7,058,414; Ser. No. 09/685,201 filed Oct. 10, 2000, entitled CARRIERLESS ULTRA WIDEBAND WIRELESS SIGNALS FOR CONVEYING APPLICATION DATA, now issued as U.S. Pat. No. 6,505,032; Ser. No. 09/685,205 filed Oct. 10, 2000, entitled SYSTEM AND METHOD FOR GENERATING ULTRA WIDEBAND PULSES, now issued as U.S. Pat. No. 7,010,056; Ser. No. 09/684,782 filed Oct. 10, 2000, entitled ULTRA WIDEBAND COMMUNICATION SYSTEM, METHOD, AND DEVICE WITH LOW NOISE RECEPTION, now issued as U.S. Pat. No. 6,859,506; and Ser. No. 09/685,199 filed Oct. 10, 2000, entitled A LOW POWER, HIGH RESOLUTION TIMING GENERATOR FOR ULTRA-WIDE BANDWIDTH COMMUNICATION SYSTEMS, now issued as U.S. Pat. No. 6,975,665, the entire contents of each of which being incorporated herein by reference.

The entire contents of Lathi, "Modern Digital and Analog Communications Systems," Holt, Rinehart and Winston, 1998 is incorporated herein by reference.

BACKGROUND OF THE INVENTION

1. Field of the Invention

The present invention is directed to ultra wide bandwidth communication systems and, more particularly, to a receiver included in ultra wide-band communications systems.

2. Description of the Related Art

An ultra wide bandwidth spread-spectrum communications system is disclosed in U.S. Utility patent application Ser. No. 09/209,460 filed Dec. 11, 1998. In the ultra wide bandwidth spread-spectrum communication system disclosed in the foregoing application, data is transmitted between a transmitter and a receiver through multiple pathways. Transmission of data from a transmitter to a receiver through multiple pathways is referred to as multi-path communications.

The transmitted data is encoded by the transmitter using sequences of N wavelets of particular shapes and positions. Each of the sequences of N wavelets is referred to as an N-length code and represents one bit of digital data, either logical "1" or logical "0". Whether a particular sequence of wavelets represents a logical "1" or a logical "0" is selected arbitrarily according to the source data at the transmitter. For example, a logical "1" would be represented by the sequence of wavelets shown in FIG. 1A, while a logical "0" would be represented by a the same sequence of wavelets inverted as shown in FIG. 1B.

As shown in FIGS. 1A and 1B, the period of each wavelet of each waveform RF is 500 picoseconds (ps), with some arbitrary delay occurring between each wavelet referred to as a chip period. That is, a chip period refers to time from one wavelet to a corresponding location on the next wavelet, such as center-to-center. The N-length code is transmitted between $t=t_0$ and $t=T$.

FIG. 2 shows a receiver correlator structure 10 which receives data organized into N-length codes. The data, carried on signal RF, impinges on an antenna 12, and is transmitted to coupled mixer 14. Mixer 14 also receives a local oscillator signal, LO, generated by a wavelet generator (not shown in FIG. 2).

Signal LO is a pulse stream divided into N-length codes, matched in time to the N-length codes of signal RF. Each N-length code of signal LO represents the same logical value as the prior four-length code of signal LO. That is, the signal LO provides the same value, either logical "0" or logical "1" code as sent by the transmitting source device, to mixer 14. Mixer 14 mixes signal RR with signal LO to produce signal IF=RF*LO.

An example of a waveform for signal LO, having a four-length code corresponding to logical "0" code, is shown in FIG. 1B traveling between time $t=t_0$ and $t=T$.

FIG. 3 shows the simplest code in which every chip is the same.

FIGS. 4A and 4B show example waveforms corresponding to signal IF at the output of mixer 14. The resultant IF waveform shown in FIG. 4A is produced when signal RF, having a value of logical "1" code shown in FIG. 1A, is mixed by mixer 14 with signal LO also having a value of logical "1" code. The resultant IF waveform shown in FIG. 4B is produced when signal REF having a value of logical "0" code shown in FIG. 1B is mixed by mixer 14 with signal LO having a value of logical "1" code.

Signal IF is then integrated by integrator 16 and, subsequently, converted to a digital signal D by analog-to-digital (A/D) converter 18. Digital signal processor (DSP) 20 then removes noise from the resultant integrated digital signal by implementing algorithms known to one of ordinary skill in the art.

Mixer 14, integrator 16, analog-to-digital convertor 18 and digital signal processor 20 are conventional components.

Mixer 14 and integrator 16 comprise, ideally, a mathematically matched filter for signal RF. Moreover, integrator 16 is aligned correctly with each bit of data and as would be apparent to one of ordinary skill in the art, will either ramp up or ramp down, depending upon the value corresponding to a particular bit integrated by integrator 16.

Since imperfect isolation occurs between signal LO and signal RF at mixer 14, resulting in leakage current 22 between signal LO and signal RF, a bias in signal IF is included at the output of mixer 14.

FIGS. 5A-5C show graphs of relative values of signals IF, I, and D shown in FIG. 2. As shown in FIGS. 5A-5C, if signal IF is as shown in FIG. 4A, then the waveform of signal I would appear as shown in FIG. 5B, and the waveform of signal D would appear as shown in FIG. 5C. The waveform of signal I shown in FIG. 5B includes an upward slope from 0V to 1V, from 1V to 2V, etc. due to both DC and AC components present in signal I, which were introduced by signal LO into mixer 14 and integrated by integrator 16.

At time $t=t_0$, and at each subsequent sampling point through $t=T$ executed by integrator 16, the value of signal I increases by 1, but that increase is a sloped increase due to DC components included in I, until a value of "4" is reached at time $t=T$. Between $t=t_0$ and $t=T$, the value of $D_i$ is 0. At time $t=T$, A/D 18 samples I and increases the value of D to D=4. That is, $D_i+1=4$. Thereafter, the integrator 16 is reset to ground causing D to be reset to 0. That is, $D_i+2=0$.

Referring again to FIG. 2, when signal LO is transmitted to mixer 14, leakage current 22 results in a DC offset (or bias) being provided to signal IF at the output of mixer 14, and the resultant DC offset is integrated by integrator 16. Moreover, the value of signal LO is relatively large being typically in the range of volts) compared to the value of signal RF (being typically in the range of microvolts), making it difficult for receiver correlator structure 10 to distinguish between signal LO and signal RF after signals LO and RF are mixed by mixer 14.

More particularly, signal LO interferes with signal RF by coupling to RF, by radiating into the air and thus impinging upon antenna 12, and by radiating to and bouncing back from antenna 12.

Moreover, signal LO when provided to mixer 14 causes the above-mentioned bias to change randomly over time, resulting in mixer 14 having an output quantity of noise proportional to 1/f, where f is a frequency.

A problem with the ultra wide bandwidth receivers of the related art is that the mixer may transmit a leakage current from the local oscillator signal (which is typically in the range of microvolts) to the input of the mixer which receives the pulses, resulting in a DC offset (or bias) from the leakage current being provided at the output of the mixer. This bias then propagates as noise through the rest of the receiver, and interferes with the decoding of the information carried on the pulses.

Another problem with ultra wide bandwidth receivers of the related art is that the analog-to-digital converter may not sample the waveform output by the bandpass receiver at a sample point which corresponds to the maximum height of the waveform.

SUMMARY OF THE INVENTION

It is an object of the present invention to eliminate the DC component of signal IF yet optimally detect a long stream of logical "1"'s or "0"'s while using real, non-ideal components such as diode ring mixers, FET bridge mixers, Gilbert Cell mixers, dual-gate MOS FETs, etc.

It is another object to the present invention to reset the bias introduced to a received signal by a mixer in a receiver correlator to 0 in a single chip period.

It is also an object of the invention to null the AC-bias signal caused by leakage between signal LO and signal IF at the sampling instant, and to do so without the need for digital estimation and subtraction algorithms and processing.

It is a further object of the invention to broaden the peak of the waveform at the output of the bandpass filter so that a converter slower than an ultra wide bandwidth converter can be included in the receiver correlator of the present invention.

It is another object of the invention to eliminate 1/f noise from all mixer leakage terms and mixing terms and non-linearities.

The above objects can be attained by a system that receives a sequence of wavelets that are not back to back but have sufficient spacing $T_S$ as input signal RF and as a local oscillator signal LO.

More particularly, the present invention is a receiver correlator structure and corresponding method. The receiver correlator structure of the present invention comprises an antenna, a mixer, a bandpass filter, and a converter. The antenna receives an ultra wide bandwidth signal comprising a sequence of wavelets of particular shapes and positions. The mixer is coupled to the antenna and receives from the antenna the ultra wide bandwidth signal and mixing the ultra wide bandwidth signal with a local ultra wide bandwidth signal comprising a sequence of wavelets of particular shapes and positions correlated to the sequence of wavelets of particular shapes and positions of the received ultra wide bandwidth signal. The bandpass filter is coupled to the mixer output and receives the mixed ultra wide bandwidth signal, removing the DC components therefrom. The bandpass filter outputs a resultant signal in which an initial peak of the resultant signal is proportional to energy included in the mixed ultra wide bandwidth signal and post signal decay of the resultant signal to zero occurs in $T_S$ time. The convertor is coupled to the bandpass filter and converts the resultant signal at the initial peak to a digital output signal. The convertor is coupled optionally to a digital signal processor. The converter is one of an analog-to-digital converter, a comparator, or a sample and hold circuit coupled in series to an integrator then to an analog-to-digital converter.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 4A and 4B show example waveforms of signal IF shown in FIG. 2.

FIGS. 5A, 5B, and 5C show graphs of relative values of signals IF, I, and D shown in FIG. 2.

FIGS. 10A and 11B show examples of waveform IF at the output of mixer 40 of the receiver correlator of the present invention.

FIG. 11A shows band pass filter 42 being applied to signal IF.

FIG. 11B shows the resultant waveform at the output of band pass filter 42.

FIG. 12 shows an example of a series of wavelets transmitting data to the receiver correlator structure of the present invention.

FIG. 14 shows a table of outputs by receiver correlator 10 of the related art and receiver correlator 30 of the present invention.

FIG. 15 shows an ultra wide bandwidth communication system in which the receiver correlator of the present invention would be included.

FIG. 16 shows a diagram of a UWB Waveform Correlator of the ultra wide bandwidth communication system shown in FIG. 15.

FIG. 17 shows a diagram of a Radio Controller and Interface of the ultra wide bandwidth communication system shown in FIG. 15.

DESCRIPTION OF THE PREFERRED EMBODIMENTS

Figure 1A:
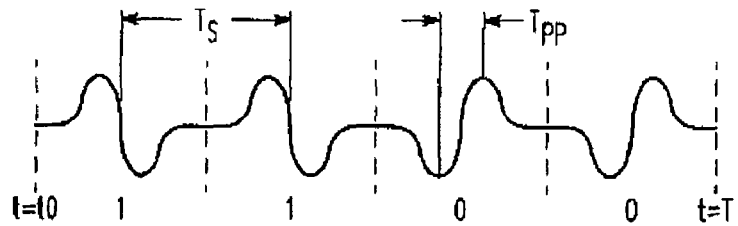
FIG. 1A shows a sequence of wavelets (or chips) representing a logical "1" code.
Figure 1B:
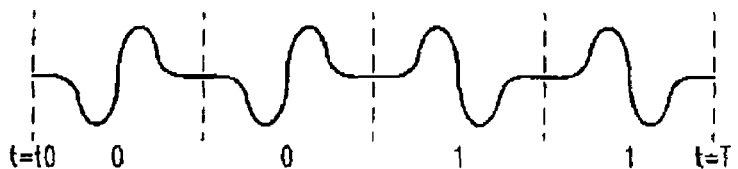
FIG. 1B shows a sequence of wavelets (chips) representing a logical "0" code.
Figure 2:
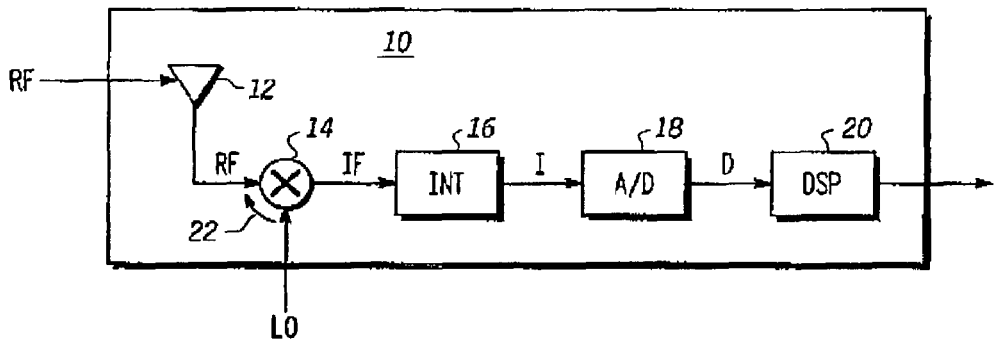
FIG. 2 shows a receiver correlator structure
Figure 3:
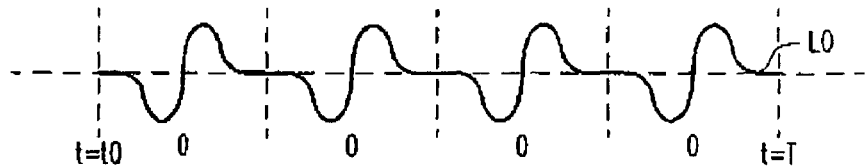
FIG. 3 shows an example of a waveform output by a local oscillator LO and input to the receiver correlator structure shown in FIG. 2.
Figure 6:
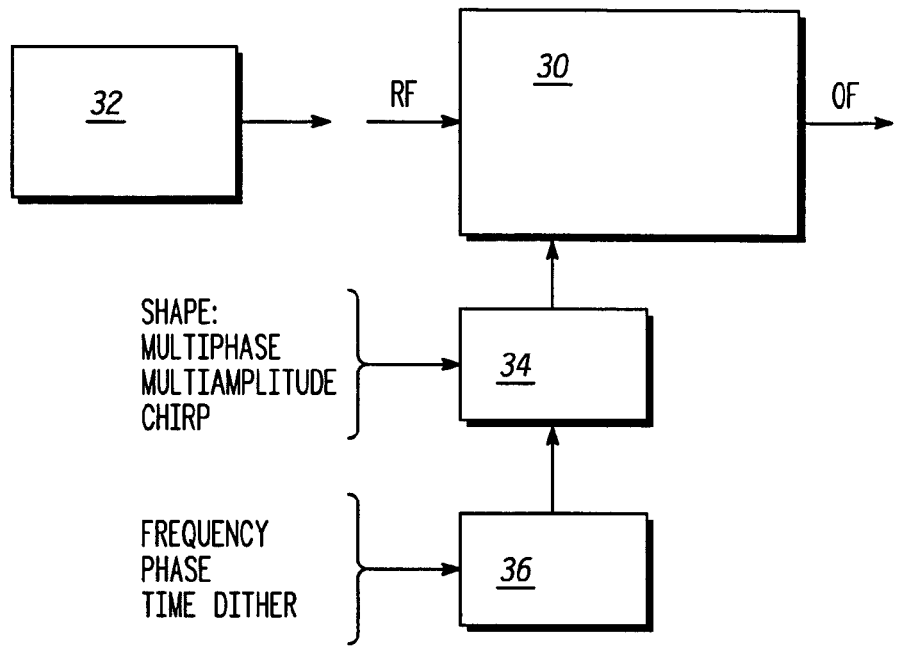
FIG. 6 shows a receiver correlator of the present invention.

FIG. 6 shows a receiver correlator 30 of the present invention which receives from transmitter 32 an ultra wide bandwidth signal RF. Ultra wide bandwidth signal RF comprises a sequence of wavelets of particular shapes and positions. Transmitter 32 is disclosed in Ser. No. 09/685,205 filed Oct. 10, 2000, entitled SYSTEM AND METHOD FOR GENERATING ULTRA WIDEBAND PULSES, incorporated herein by reference, and in Ser. No. 09/684,400 filed Oct. 10, 2000, entitled ULTRA WIDEBAND COMMUNICATION SYSTEM, METHOD, AND DEVICE WITH LOW NOISE PULSE FORMATION, incorporated herein by reference.

In addition, the receiver correlator structure 30 of the present invention receives an ultra wide bandwidth signal LO. Ultra wide bandwidth signal LO comprises a sequence of wavelets of particular shapes and positions corresponding to ultra wide bandwidth signal RF. Ultra wide bandwidth signal LO is produced by timing generator 36 as disclosed in co-pending application Ser. No. 09/685,199 filed Oct. 10, 2000, entitled A LOW POWER, HIGH RESOLUTION TIMING GENERATOR FOR ULTRA-WIDE BANDWIDTH COMMUNICATION SYSTEMS, incorporated herein by reference. More particularly, timing generator 36, based upon inputs of frequency, phase, and time dither, prompts wavelet generator 34 to generate signal LO, which is time-aligned with signal RF.

Wavelet generator 34 is disclosed in co-pending application Ser. No. 09/685,205 filed Oct. 10, 2000, entitled SYSTEM AND METHOD FOR GENERATING ULTRA WIDEBAND PULSES, incorporated herein by reference.

The shape of the wavelet of signal LO generated by wavelet generator 34 can vary, with shapes such as biphase, multi-amplitude, multi-phase, and chirp.

Figure 7:
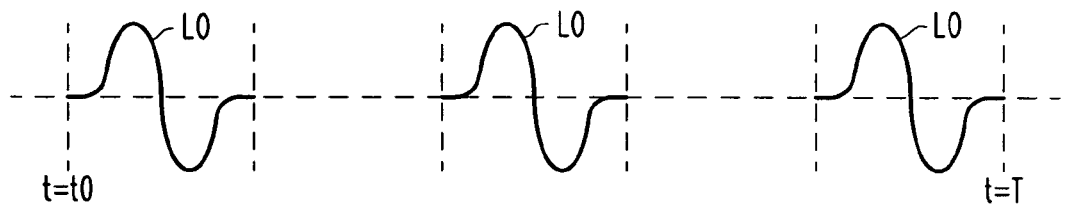
FIG. 7 shows an example of a waveform presented by local oscillator LO to the receiver correlator of the present invention.

FIG. 7 shows an example of a waveform presented by signal LO in FIG. 6. The waveform LO shown in FIG. 7 was generated by wavelet generator 34 and has a constant pulse shape.

Figure 8:
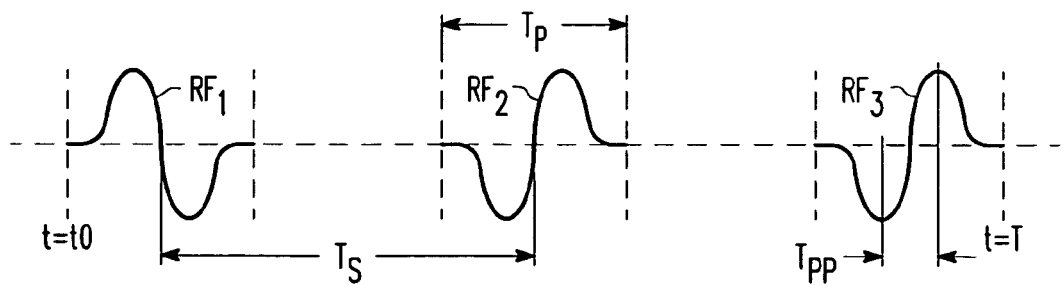
FIG. 8 shows a series of signals RF input to the receiver correlator of the present invention shown in FIG. 6.

FIG. 8 shows a series of signals $RF_1$, $RF_2$, $RF_3$, ... which are wavelets, having a period of $T_S$. Each wavelet, or series of wavelets, of ultra wide bandwidth signal RF corresponds to a logical "1" or a logical "0", depending upon the shape of the wavelet of signal RF. That is, $RF_1$ of FIG. 8 could correspond to logical "1" (and signal LO of FIG. 7), while $RF_2$ and $RF_3$ of FIG. 8 could each correspond to logical "0". As shown in FIG. 8, $T_p$ is less than $T_S$ (the center-to-enter clock period), and $T_{pp}$ (peak to peak) is less than $T_p$. $T_p$ is the width of the wavelet, and is typically twice $T_{pp}$. An example of $T_{pp}$ would be 330 pico-seconds (peak-to-peak); an example of $T_S$ would be 20 nano-seconds.

Figure 9A:
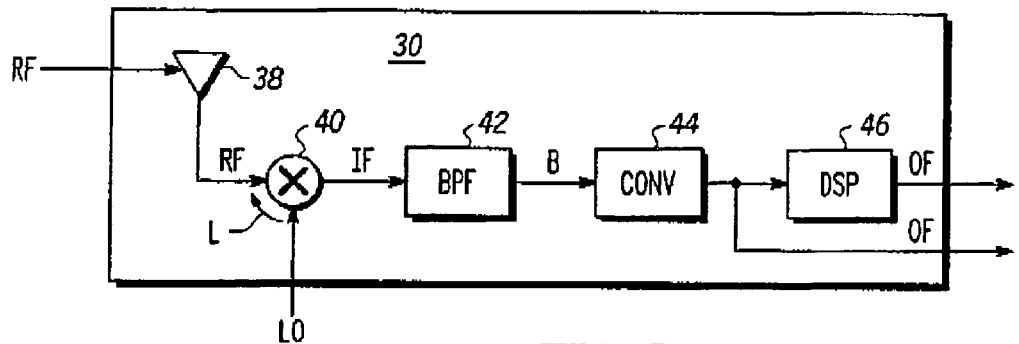
FIG. 9A shows a detailed diagram of the receiver correlator of the present invention.

FIG. 9A shows a more detailed diagram of receiver correlator structure 30 of the present invention. As shown in FIG. 9A, signal RF impinges upon antenna 38, and is coupled to mixer 40. Antenna 38 could be a conventional antenna or could be of the structure disclosed in co-pending U.S. patent application Ser. No. 09/563,292 filed May 3, 2000, entitled PLANAR ULTRA WIDE BAND ANTENNA WITH INTEGRATED ELECTRONICS, incorporated herein by reference.

Mixer 40 receives signal RF and local oscillator signal LO, which is time-aligned with signal RF as discussed in co-pending U.S. patent application Ser. No. 09/685,197 filed Oct. 10, 2000, entitled MODE CONTROLLER FOR SIGNAL ACQUISITION AND TRACKING IN AN ULTRA WIDEBAND COMMUNICATION SYSTEM, incorporated herein by reference, and in Ser. No. 09/685,195 filed Oct. 10, 2000, entitled ULTRA WIDE BANDWIDTH SYSTEM AND METHOD FOR FAST SYNCHRONIZATION, incorporated herein by reference.

In one embodiment, the pulse shape of signal LO can be constant. That is, each waveform generated by wavelet generator 34 (shown in FIG. 6) is the same as the prior waveform of signal LO, and corresponds to either a logical "1" or a logical "0", but does not vary from pulse to pulse. Consequently, leakage L (shown in FIGS. 9A and 9B) of signal LO between mixer 40 and antenna 38 is always the same from pulse to pulse of signal LO. This leakage L is non-linear, and is removed as discussed herein below.

Mixer 40 is, for example, a Mini-circuits ADE-42 MH.

After signals RF and LO are mixed by mixer 40, the resultant, mixed signal IF is transmitted from mixer 40 to band pass filter 42. Band pass filter 42 removes DC components from signal IF. That is, band pass filter 42 removes any bias introduced by mixer 40 by resetting the bias to 0 in a single chip period. Thus, in band pass filter 42, the settling time is less then the bit. More particularly, band pass filter 42 removes 1/f noise. Band pass filter 42 is discussed in further detail with reference to FIGS. 13A and 13B.

Figure 9B:
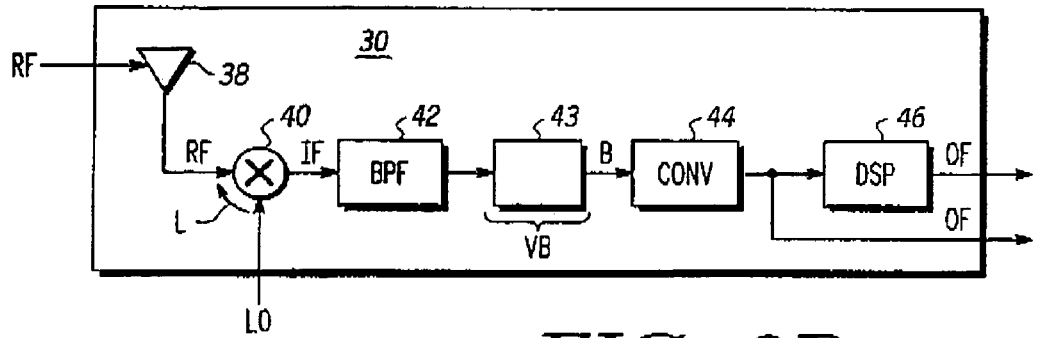
FIG. 9B shows another embodiment of the receiver correlator of the present invention.

FIG. 9B shows another embodiment of the present invention which includes adder 43. Adder 43 has a bias voltage $V_B$. $V_B$ is set such that when signal RF=0, the output of convertor 44 (if convertor 44 is an analog-to-digital convertor) is OV at sampling point S. If converter 44 is a comparator, then. $V_B$ is set such that the comparator has a 50% duty cycle. If $V_B$ is not set in this way, then DSP 46 would have to estimate $V_B$ across a series of bits decoded from the wavelets of received ultra wide bandwidth signal RF. However, setting $V_B$ as described would save time and battery life over having DSP 46 estimate $V_B$.

Figure 9C:
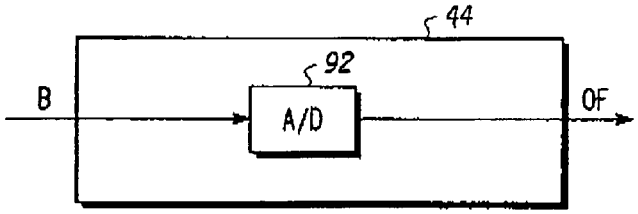
FIGS. 9C, 9D, and 9E show alternate embodiments of converter 44.
Figure 9D:
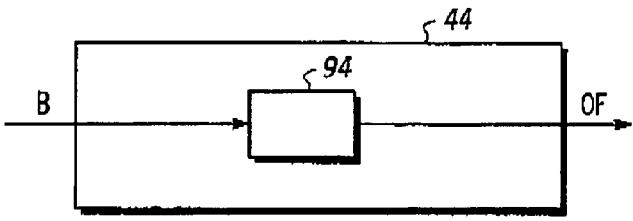
Figure 9E:
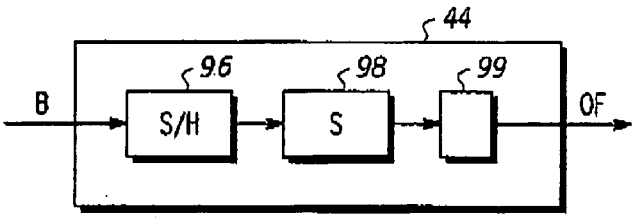

FIGS. 9C, 9D, and 9E show alternate embodiments of the convertor 44. FIG. 9C shows analog-to-digital converter 92; FIG. 9D shows comparator 94; and FIG. 9E shows sample-and-hold circuit 96 coupled in series to integrator 98, which is coupled in series to analog-to-digital convertor 99.

In one embodiment, integrator 98 would function as a D-latch circuit, in which the integrator would sample a signal input thereto on the rising edge of a clock pulse input to the integrator 98, and transfers to the output of integrator 98 the signals that were integrated since the prior clock pulse. Such an integrator 98 would comprise a ping-pong circuit, which would comprise two integrators functioning during alternate clock periods. An example of such an integrator 98 is disclosed in U.S. patent application Ser. No. 09/209,460 filed Dec. 11, 1998, entitled ULTRA WIDE BANDWIDTH SPREAD-SPECTRUM COMMUNICATIONS SYSTEM, incorporated herein by reference, and in U.S. patent application Ser. No. 09/633,815 filed Aug. 7, 2000, entitled ELECTRICALLY SMALL PLANAR UWB ANTENNA, incorporated herein by reference.

An example of waveform IF, at the output of mixer 40, is shown in FIG. 10A. For the shape of waveform IF shown in FIG. 10A, the shape of the waveform input in signal RF corresponds to a logical "1", and the shape of the waveform input by signal LO also corresponds to a logical "1". Of course, if RF and LO were logically opposite to each other, then the shape of waveform IF at the output of mixer 40 would correspond to waveform IF shown in FIG. 10B.

Moreover, in the signal IF shown in FIGS. 10A and 10B, the peak-to-peak difference between pulses is typically less than 1 nanosecond, though in some applications could be longer.

Band pass filter 42 accommodates waveform IF as shown in FIG. 10A and in FIG. 10B. That is, band pass filter 42 recognizes dynamically whether signal IF corresponds to the waveform shown in FIG. 10A or corresponds to the waveform shown in FIG. 10B, and removes the DC components, and therefore the bias introduced by mixer 40, from either.

FIG. 11A shows band pass filter 42 being applied to signal IF, and FIG. 11B shows resultant signal B, at the output of the band pass filter 42, after band pass filter 42 is applied to signal IF. That is, signal B corresponds to signal IF, but with DC components present in signal IF removed from signal B by band pass filter 42, and the AC signal leaked by mixer 40 from signal LO, removed at the sampling instant S. Also as shown in FIG. 11A, in the receiver correlator of the present invention, the sampling instant S by the convertor 44 occurs at the relative maximum (or peak) or relative minimum of the output waveform from the bandpass filter 42.

As shown in FIG. 11A, the settling time of the band pass filter 42 is less than the bit period of the data encoded in signal IF.

Signal B is then transmitted to convertor 44, which samples signal B at each respective peak thereof. That is, convertor 44 samples signal B at sampling points S shown in FIG. 11A. Convertor 44 is an analog-to-digital convertor. Alternatively, convertor 44 is a comparator. Alternatively still, convertor 44 is a sample-and-hold circuit coupled in series to an integrator and to an analog-to-digital convertor.

Convertor 44 is biased by $V_b$ such that the output of the convertor 44 is at the 0-volt threshold (or zero mean), when there is no RF signal or the RF signal is white Gaussian noise. That is, each bit is resolved to 0 by the combination of band pass filter 42 and convertor 44. The Convertor 44 is, for example a Texas Instruments TLV 5580.

For pulses (or wavelets) transmitted as signal RF which correspond to logical "1" or logical "0", then output signal OF is output by receiver correlator structure 30 directly from Convertor 44.

Each pulse transmitted as signal RF, and ultimately, as signal IF and signal B, corresponds to a logical "1" or a logical "0" in the embodiment described here and above.

Alternatively, a series of single spike pulses, RF, represent a bit. That is, a series of two consecutive single spike pulse correspond to either logical "1" or logical "0". If a series of single spike pulses corresponds to either logical "1" or logical "0" then a digital signal processor DSP 46 is placed at the output of Convertor 44. The DSP 46 receives the output signal from Convertor 44 and digitally integrates the output signal. That is, DSP 44 implements an algorithm readily apparent to those of skill in the art to sum or add the series of pulses such that each series of pulses is determined to be to correspond to either a logical "1" or a logical "0". DSP 46 is, for example an Intel Pentium™. processor.

FIG. 12 shows a series of pulses, RF, which when received by receiver correlator structure 30 of the present invention, resolve through the activities of antenna 38, mixer 40, band pass filter 42, Convertor 44 and DSP 46 as described herein above, to a logical "1". Although the series of pulses RP correspond to logical "1" each single spike pulse is spaced from another single spike pulse by a period of $T_S$.

Figure 13A:
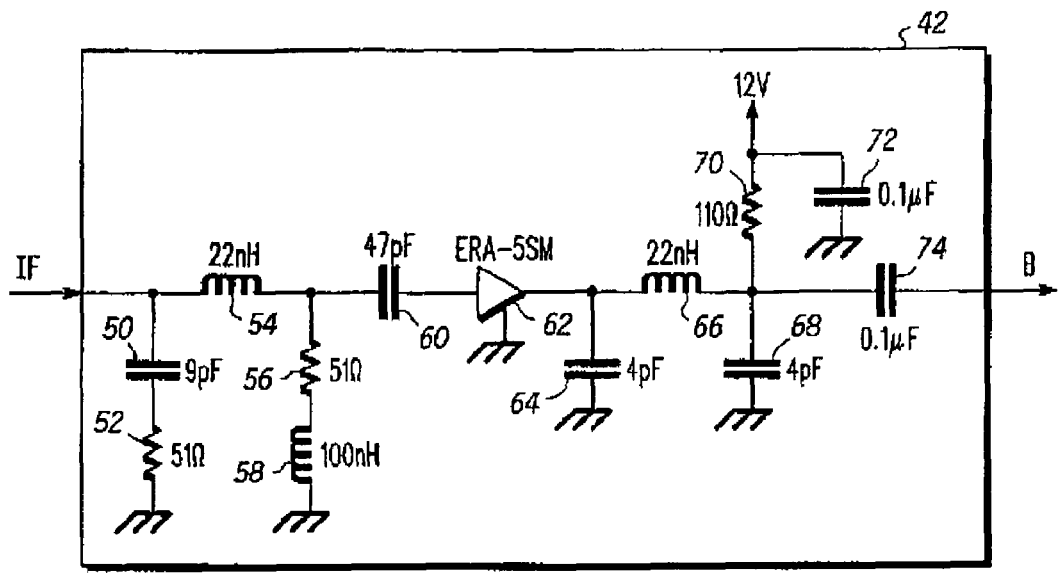
FIG. 13A shows one embodiment of band pass filter 42.

FIG. 13A shows an embodiment of band pass filter 42. Referring now to FIG. 13A, signal IF enters band pass filter 42 along an input port which is tied to ground through a 9-picoFarad capacitor 50 and a 51-ohm resister 52 and proceeds to 22-nanoHenry inductor 54. The output of inductor 54 is tied to ground through 51-OHM resistor 56 and 100-nanoHenry inductor 58 and to 47-picoFarad capacitor 60, which is input to amplifier ERA-5SM 62. The output of amplifier 62 is tied to ground through 4-picoFarad capacitor 64 and to 22-nanoHenry inductor 66. The output of inductor 66 is tied, concurrently, to ground through 4-picoFarad capacitor 68, and to a 12-volt power source through 110-ohm resistor 70, which is in parallel with 0.01-microFarad capacitor 72, also tied to ground. The output of inductor 66 travels through 0.01-microFarad capacitor 74 to become output B.

Figure 13B:
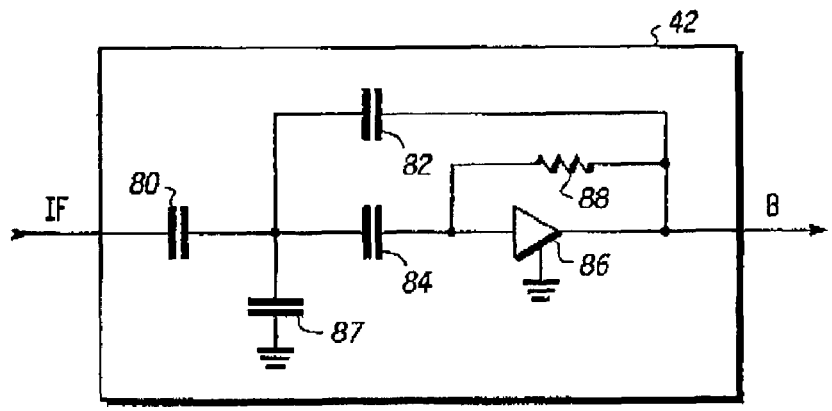
FIG. 13B shows another embodiment of band pass filter 42.

An alternate embodiment of band pass filter 42 is shown in FIG. 13B. Referring now to FIG. 13B, input signal IF travels through capacitor 80, the output of which is tied in parallel to capacitor 82, capacitor 84 and ground through capacitor 86. Signal IF continues through capacitor 84 into amplifier 86 and through capacitor 82 to the output of amplifier 86. The output of amplifier 86 is tied through resistor 88 back to the input of amplifier 86 and is output from band pass filter 42 at signal B.

FIG. 14 shows a table 90 of outputs by receiver correlator 30 and receiver correlator 10, based upon input signal RF and local oscillator LO. As shown in FIG. 14, when input signal RF is corresponds to logical "1" and local oscillator corresponds to logical "1", receiver correlator 30 of the present invention outputs a value of +1, whereas receiver correlator 10 would output a value of 1+a, which is perhaps a value other than +1. Likewise, if RF corresponds to logical "0" and LO corresponds to logical "0", receiver correlator 30 would output +1 whereas receiver correlator 10 would output a value of 1-b, which is also perhaps a value other than +1. In addition, if RF corresponds to logical "1", and LO corresponds to logical "0" receiver correlator 30 outputs –1 and receiver correlator 10 outputs –1-b, which is perhaps a value other than –1. Lastly if RF corresponds to "0" and LO corresponds to "1" receiver correlator 30 outputs –1 and receiver correlator 10 outputs –1-a, which is also perhaps a value other than –1.

Receiver correlator 10 outputs a and b because of the affect of the bias between mixer 14 and antenna 12. Moreover, a and b have 1/f noise that obscures the signal of interest.

The present invention has been described with, respect to the above-mentioned components. However, implementation of the above-mentioned functions is not limited in the present invention to the components described. For example, the present invention may be implemented in silicon on a signal chip or on multiple chips.

An ultra wide bandwidth system (that is, an ultra-wide band transceiver) in which the receiver correlator structure of the present invention could be implemented is shown in FIG. 15. The transceiver 100 shown in FIG. 15 includes a receiver 112, a transmitter 114, and a Radio Controller and Interface 110. The Receiver 112 includes antenna 102, Front End 104, UWB Waveform Correlator 106, and Timing Generator 108.

The Transmitter 114 includes antenna 116, UWB Waveform Generator 118, Timing Generator 108, and Encoder 122.

The Transceiver 100 is described in further detail in U.S. application Ser. No. 09/685,199 filed Oct. 10, 2000, entitled A LOW POWER, HIGH RESOLUTION TIMING GENERATOR FOR ULTRA-WIDE BANDWIDTH COMMUNICATION SYSTEMS, incorporated herein by reference.

The receiver correlator structure 30 of the present invention is incorporated into transceiver 100 as shown in FIGS. 16 and 17. That is, the mixer 40 and the bandpass filter 42 are included (along with wavelet generator 34) into UWB waveform correlator 106, and the convertor 44 and the DSP 46 are included in the Radio Controller and Interface 110.

That is an ultra wide bandwidth communication system of the present invention comprises a transmitter transmitting an ultra wide bandwidth signal comprising a sequence of wavelets of particular shapes and positions, a wavelet generator generating a local ultra wide bandwidth signal comprising a sequence of wavelets of particular shapes and positions corresponding to the transmitted ultra wide bandwidth signal, and a receiver correlator structure. The receiver correlator structure comprises an antenna receiving the transmitted ultra wide bandwidth signal, a mixer, coupled to the antenna, receiving from the antenna the received ultra wide bandwidth signal and mixing the ultra wide bandwidth signal with the local ultra wide bandwidth, signal, a bandpass filter, coupled to the mixer output, receiving the mixed ultra wide bandwidth signal, removing the DC components therefrom, and outputting a resultant signal, wherein an initial peak of the resultant signal is proportional to energy included in the mixed ultra wide bandwidth signal and post signal decay of the resultant signal to zero occurs in $T_S$ time, and a convertor, coupled to the bandpass filter, converting the resultant signal at the initial peak to a digital output signal.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A receiver correlator structure comprising:
   a mixer receiving an ultra wide bandwidth signal comprising a sequence of wavelets of particular shapes and positions, and mixing the ultra wide bandwidth signal with a local ultra wide bandwidth signal comprising a sequence of wavelets of particular shapes and positions correlated to the sequence of wavelets of particular shapes and positions of the received ultra wide bandwidth signal;
   a bandpass filter, coupled to the mixer output, receiving the mixed ultra wide bandwidth signal, removing the DC components therefrom, and outputting a resultant signal, wherein an initial peak of the resultant signal is proportional to energy included in the mixed ultra wide bandwidth signal and post signal decay of the resultant signal to zero occurs in $T_S$ time; and
   a convertor, coupled to the bandpass filter, converting the resultant signal at the initial peak to a digital output signal
   wherein $T_S$ is a center-to-center clock period for the wavelets in the local ultra wide bandwidth signal.

2. A receiver correlator structure comprising:
   a mixer configured to mix a received ultra wide bandwidth signal with a local ultra wide bandwidth signal to generate a mixed ultra wide bandwidth signal, the received ultra wide bandwidth signal comprising a first sequence of wavelets, and the local ultra wide bandwidth signal comprising a second sequence of wavelets;
   a bandpass filter, coupled to the mixer output, generating a filter signal, the bandpass filter being configured to:
   generate a sequence of peaks corresponding to and proportional to the energy in each of a sequence of mixed wavelets in the mixed ultra wide bandwidth signal,
   remove DC components from the mixed ultra wide bandwidth signal with a settling time on the order of a time between adjacent peaks; and
   a sampler, coupled to the bandpass filter, configured to sample the filtered signal at the peaks to generate a sampled signal.

3. A receiver correlator structure, as recited in claim 2, further comprising an integrator, coupled to the sampler, the integrator being configured to integrate the sampled signal over a sequence of N wavelets in the received ultra wide bandwidth signal to generate an integrated signal, wherein N is an integer greater than or equal to one.

4. A receiver correlator structure, as recited in claim 3, further comprising an analog-to-digital converter configured to convert the integrated signal to a digital signal.

5. A receiver correlator structure, as recited in claim 2, wherein the sampler generates a digital sampled signal.

6. A receiver correlator structure, as recited in claim 2, wherein the first sequence of wavelets has an arbitrary chip period defined to be an arbitrary delay occurring between adjacent wavelets.

7. A receiver correlator structure, as recited in claim 6, wherein arbitrary delay is one of constant between adjacent wavelets, and variable between adjacent wavelets.

8. A receiver correlator structure, as recited in claim 6, wherein the second sequence of wavelets is correlated to the first sequence of wavelets.

9. A receiver correlator structure, as recited in claim 2, wherein the second sequence of wavelets is correlated to the first sequence of wavelets.

10. A receiver correlator structure comprising:
a mixer configured to mix a received ultra wide bandwidth signal with a local ultra wide bandwidth signal to generate a mixed ultrawide bandwidth signal, the received ultra wide bandwidth signal comprising a first sequence of wavelets, and the local ultra wide bandwidth signal comprising a second sequence of wavelets;
a bandpass filter, coupled to the mixer output, generating a filter signal, the bandpass filter being configured to:
generate a sequence of peaks corresponding to and proportional to the energy in each of a sequence of mixed wavelets in the mixed ultra wide bandwidth signal,
remove DC components from the mixed ultra wide bandwidth signal with a settling time on the order of a time between adjacent peaks; and
a converter, coupled to the bandpass filter, configured to convert the filtered signal at the peaks to a digital output signal.

11. A receiver correlator structure, as recited in claim 10, wherein the converter is further configured to sample the filtered signal.

12. A receiver correlator structure, as recited in claim 10, wherein the converter comprises an analog-to-digital converter.

13. A receiver correlator structure, as recited in claim 10, wherein the converter comprises a comparator.

14. A receiver correlator structure, as recited in claim 10, wherein the converter comprises a sample-and-hold circuit, an integrator, and an analog-to-digital converter coupled in series.

15. A receiver correlator structure, as recited in claim 10, further comprising a digital signal processor coupled to the converter and configured to integrate the digital output signal over an M-length sequence of the first sequence of wavelets,
wherein M is an integer greater than or equal to one.

16. A receiver correlator structure, as recited in claim 10, wherein the resultant output signal voltage polarity corresponds to a logical "1" or a logical "0", based upon at least one of positions and shapes of the received ultra wide bandwidth signal and the local ultra wide bandwidth signal.

17. A receiver correlator structure, as recited in claim 10, wherein the receiver correlator structure receives, decodes, and outputs information encoded in a series of the first sequence of wavelets.

18. A method of operating an ultra wide bandwidth system, comprising:
receiving a first ultra wide bandwidth signal comprising a first sequence of wavelets;
generating a second ultra wide bandwidth signal comprising a second sequence of wavelets;
mixing the first ultra wide bandwidth signal with the second ultra wide bandwidth signal to generate a mixed ultra wide bandwidth signal;
generating a sequence of peaks corresponding to and proportional to the energy in each of a sequence of mixed wavelets in the mixed ultra wide bandwidth signal; and
removing DC components from the mixed ultra wide bandwidth signal with a settling time on the order of a time between adjacent peaks.

19. A method of operating an ultra wide bandwidth system, as recited in claim 18, further comprising sampling the sequence of peaks at the peaks to generate a sampled signal.

20. A method of operating an ultra wide bandwidth system, as recited in claim 19,
further comprising integrating the sampled signal over a sequence of N wavelets in the received ultra wide bandwidth signal to generate an integrated signal,
wherein N is an integer greater than or equal to one.

21. A method of operating an ultra wide bandwidth system, as recited in claim 19, further comprising converting the integrated signal to a digital signal.

22. At method of operating an ultra wide bandwidth system, as recited in claim 18, further comprising converting the sequence of peaks at the peaks to a digital output signal.

* * * * *

UNITED STATES PATENT AND TRADEMARK OFFICE
CERTIFICATE OF CORRECTION

| | | |
|---|---|---|
| PATENT NO. | : 7,400,669 B2 | Page 1 of 1 |
| APPLICATION NO. | : 11/165541 | |
| DATED | : July 15, 2008 | |
| INVENTOR(S) | : John W. McCorkle | |

It is certified that error appears in the above-identified patent and that said Letters Patent is hereby corrected as shown below:

In Column 10, Line 38, Claim No. 2:

Change "a mixed ultra wide bandwidth signal," to --a mixed ultrawide bandwidth signal,--

In Column 12, Line 40, Claim No. 22:

Change "At method of operating" to --A method of operating--

Signed and Sealed this

Fifteenth Day of June, 2010

David J. Kappos
*Director of the United States Patent and Trademark Office*